(12) United States Patent
Sellinger et al.

(10) Patent No.: US 10,698,121 B2
(45) Date of Patent: Jun. 30, 2020

(54) 10B ENRICHED PLASTIC SCINTILLATORS FOR APPLICATION IN THERMAL NEUTRON DETECTION, METHODS OF MAKING AND USING THE SAME

(71) Applicants: Alan Sellinger, Golden, CO (US); Uwe Greife, Golden, CO (US); Henok A. Yemam, Golden, CO (US); Adam Mahl, Denver, CO (US)

(72) Inventors: Alan Sellinger, Golden, CO (US); Uwe Greife, Golden, CO (US); Henok A. Yemam, Golden, CO (US); Adam Mahl, Denver, CO (US)

( * ) Notice: Subject to any disclaimer, the term of this patent is extended or adjusted under 35 U.S.C. 154(b) by 51 days.

(21) Appl. No.: 16/057,793

(22) Filed: Aug. 7, 2018

(65) Prior Publication Data

US 2019/0041533 A1    Feb. 7, 2019

Related U.S. Application Data

(60) Provisional application No. 62/589,920, filed on Nov. 22, 2017, provisional application No. 62/542,065, filed on Aug. 7, 2017.

(51) Int. Cl.
*G01T 1/203* (2006.01)
*G01T 3/06* (2006.01)
*C09K 11/06* (2006.01)
*G21K 4/00* (2006.01)

(52) U.S. Cl.
CPC ........... *G01T 1/2033* (2013.01); *C09K 11/06* (2013.01); *G01T 3/06* (2013.01); *G21K 4/00* (2013.01)

(58) Field of Classification Search
CPC ........... G01T 1/2033; G01T 3/06; G21K 4/00; C09K 11/06
See application file for complete search history.

(56) References Cited

U.S. PATENT DOCUMENTS

| 2,880,326 | A | 3/1959 | Musicant |
| 6,544,442 | B1 | 4/2003 | Bell et al. |
| 7,067,079 | B2 | 6/2006 | Bross et al. |
| 7,372,041 | B1 | 5/2008 | Nagarkar et al. |
| 7,723,114 | B1 | 5/2010 | Coates et al. |
| 7,985,868 | B1 | 7/2011 | Bauer et al. |
| 9,796,921 | B2 | 10/2017 | Pecinovsky |
| 9,864,077 | B2 | 1/2018 | Sellinger et al. |
| 2005/0208290 | A1 | 9/2005 | Patel |
| 2006/0054863 | A1 | 3/2006 | Dai et al. |
| 2007/0085010 | A1 | 4/2007 | Letant et al. |
| 2007/0205369 | A1 | 9/2007 | Huth et al. |
| 2009/0318680 | A1 | 12/2009 | Vicente et al. |
| 2010/0092363 | A1 | 4/2010 | Graeve et al. |
| 2010/0256923 | A1 | 10/2010 | Payne et al. |

(Continued)

OTHER PUBLICATIONS

U.S. Appl. No. 16/005,368, filed Jun. 11, 2018, Yemam et al.

(Continued)

*Primary Examiner* — Michael C Bryant
(74) *Attorney, Agent, or Firm* — Sheridan Ross P.C.

(57) ABSTRACT

The present invention relates to a $^{10}$B enriched plastic scintillators, methods of making the same and methods of using the same. Neither carboranes nor $^3$He are required to be included in the plastic scintillators, which can be used in neutron detection.

12 Claims, 6 Drawing Sheets
(3 of 6 Drawing Sheet(s) Filed in Color)

(56) References Cited

U.S. PATENT DOCUMENTS

| | | |
|---|---|---|
| 2013/0187056 A1 | 7/2013 | Nikolic et al. |
| 2013/0270443 A1 | 10/2013 | Dijkstra et al. |
| 2014/0027646 A1 | 1/2014 | Zaitseva et al. |
| 2014/0042330 A1 | 2/2014 | Gozani et al. |
| 2014/0151567 A1 | 6/2014 | Slaughter et al. |
| 2014/0346400 A1 | 11/2014 | Pei et al. |
| 2015/0232387 A1 | 8/2015 | Lambertin et al. |
| 2016/0017220 A1 | 1/2016 | Hamel et al. |
| 2016/0145214 A1 | 5/2016 | Douce et al. |
| 2016/0178766 A1* | 6/2016 | Sellinger .......... G01T 3/06 250/473.1 |
| 2016/0186052 A1 | 6/2016 | Zaitseva et al. |
| 2017/0038483 A1 | 2/2017 | Payne et al. |
| 2017/0260448 A1 | 9/2017 | Cherepy et al. |

OTHER PUBLICATIONS

U.S. Appl. No. 16/150,138, filed Oct. 2, 2018, Yemam et al.
"Pulse Shape Discrimination: EJ-276 & EJ-276G," Eljen Technology, 2016, retrieved from https://eljentechnology.com/products/plastic-scintillators/ej-299-33a-ej-299-34, 2 pages.
Audi et al., "The 1995 update to the atomic glass evaluation," Nuclear Physics A, vol. 595, No. 4, Dec. 1995, pp. 409-480, abstract only.
Bagan et al,, "Crosslinked plastic scintillators: A new detection system for radioactivity measurement in organic and aggressive media," Analytica Chimica Acta, vol. 852, Dec. 2014, pp. 13-19, abstract only,.
Bao et al., "Water-Soluble Hyperbranched Polyelectrolytes with High Fluorescence Quantum Yield: Facile Synthesis and Selective Chemosensor for Hg2+ and Cu2+ Ions," Journal of Polymer Science Polymer Chemistry, 2010, vol. 48(15), pp. 3431-3439, 2 page, abstract only.
Bell et al., "Boron-loaded silicone rubber scintillators," IEEE Transactions on Nuclear Science, 2004, vol. 51(4), pp. 1773-1776, 1 page, abstract only.
Bell et al., "Organic scintillators for neutron detection," SPIE, 2003, 1 page, abstract only.
Bertrand et al., "Current Status on Plastic Scintillators Modifications," Chemistry: A European Journal, vol. 20, No. 48, 2014, pp. 15660-15685, abstract only.
Bertrand et al., "Influence of bismuth loading in polystyrene-based plastic scintillators for low energy gamma spectroscopy," Journal of Materials Chemistry C, vol. 2, No. 35, 2014, pp. 7304-7312.
Blachot et al., "Table of radioactive isotopes and of their main decay characteristics," Annales de Physique (Paris), vol. 6, Jan. 1981, pp. 3-218, abstract only.
Borkar et al., "New Highly Fluorinated Styrene-Based Materials with Low Surface Energy Prepared by ATRP," Macromolecules, vol. 37, No. 3, 2004, pp. 788-794, abstract only.
Britvich et al., "New Polystyrene-Based Scintillators," Instruments and Experimental Techniques, vol. 45, No. 5, Sep. 2002, pp. 644-655, abstract only.
Brun et al., "ROOT—An object oriented data analysis framework," Nuclear Instruments and Methods in Physics Research A., vol. 389, 1997, pp. 81-86.
Cameron et al., "Fogging in Polyvinyl Toluene Scintillators," IEEE Transactions on Nuclear Science, vol. 62, No. 1, Feb. 2015, pp. 368-371, abstract only.
Chen et al., "Surface properties and chain structure of fluorinated acrylate copolymers prepared by emulsion polymerization," Polymer Bulletin, vol. 64, Jan. 2010, pp. 81, abstract only.
Cherepy et al., "Bismuth- and lithium-loaded plastic scintillators for gamma and neutron detection," Nuclear Instruments and Methods in Physics Research A, vol. 778, 2015, pp. 126-132.
Drake et al., "New electronically black neutron detectors," Los Alamos National Laboratory, LA-10611, 1986, retrieved from http://www.iaea.org/inis/collection/NCLCollectionStore/_Public/17/078/17078930.pdf, retrieved on Apr. 22, 2016, 17 pages.

Drake et al., "New electronically black neutron detectors," Nuclear Instruments and Methods in Physics Research Section A: Accelerators, Spectrometers, Detectors and Associated Equipment, 1986, vol. A247(3), pp. 576-582 (1986), 1 page, abstract only.
Feng et al., "Pulse-Shape Discrimination in High-Symmetry Organic Scintillators," IEEE Transactions on Nuclear Science, vol. 60, No. 4, Aug. 2013, pp. 3142-3149, abstract only.
Geny et al., "Cobalt(I)-mediated preparation of polyborylated cyclohexadienes: Scopte, limitations, and mechanistic insight," Chemistry A European Journal, 2007, vol. 13(19), pp. 5408-5425, 2 page, abstract only.
Hambsch et al., "The 10B(n,α0)/10B(n,α1γ) Branching Ratio," Nuclear Science and Engineering, vol. 156, No. 1, 2007, pp. 103-114, abstract only.
He et al., "Nucleophile-Selective Cross-Coupling Reactions with Vinyl and Alkynyl Bromides on a Dinucleophilic Aromatic Substrate," European Journal of Organic Chemistry, 2015, pp. 2498-2502, abstract only.
Iannazzo et al., "Alkynylboronates and -boramides in Col- and RhI-Catalyzed [2+2+2] Cycloadditions: Construction of Oligoaryls through Selective Suzuki Couplings," European Journal of Organic Chemistry, 2011, vol. 2011(18), pp, 3283-3292, 2 page, abstract only.
Immergut et al., "Principles of Plasticization," in "Plasticization and Plasticizer Processes," Advances in Chemistry, vol. 48, Jan. 1965, pp. 1-26, abstract only.
Ishiyama et al., "Bis(pinacolato)Diboron," Organic Syntheses, vol. 77, 2000, 6 pages.
Kouzes et al., "Progress in alternative neutron detection to address the helium-3 shortage," Nuclear Instruments and Methods in Physics Research A, vol. 784, Jun. 2015, pp. 172-175.
Li et al., "Synthesis and characterization of new polymethacrylates bearing perfluorocyclobutyl and sulfonyl units," Polymer, vol. 50, No. 22, Oct. 2009, pp. 5192-5199, abstract only.
Liu et al., "Synthesis and properties of starburst amorphous molecules: 1,3,5-tris(1,8-naphthalimide-4-yl)benzenes," Synthetic Metals, 2010, vol. 160(19-20), pp. 2055-2060, 1 page, abstract only.
Martinez et al,, "Pulse shape discrimination in non-aromatic plastics," Nuclear Instruments and Methods in Physics Research A, vol. 771, Jan. 2015, pp. 28-31, abstract only.
Matsumoto et al., "A kinetically protected pyrene: molecular design, bright blue emission in the crystalline state and aromaticity relocation in its dicationic species," Chemical Communications, 2014, vol. 50(75), pp. 10956-10958, 2 pages, abstract only.
Mehrotra et al., "Recent Advances in the Chemistry of Homo- and Heterometallic Alkoxides of p-Block Metal(loid)s," Chemical Reviews, vol. 94, No. 6, 1994, pp. 1643-1660, introduction only.
Meijer et al., "Towards Compact Antineutrino Detectors for Safeguarding Nuclear Reactors," IAEA Report, IAEA-CN-184/74, 2010, 6 pages.
Montbarbon et al., "Structural Variation of Carbazole Derivatives for Plastic Scintillation Applications," ChemPhotoChem, vol. 1, No. 10, Oct. 2017, pp. 451-458, abstract only.
Paff et al., "Radionuclide identification algorithm for organic scintillator-based radiation portal monitor," Nuclear Instruments and Methods in Physics Research A, vol. 849, Mar. 2017, pp. 41-48, abstract only.
Pawelczak et al., "Boron-loaded Plastic Scintillator with Neutron-Gamma Pulse Shape Capability," Nuclear Instruments and Methods A, vol. 751, 2014, pp. 62-69.
Pla-Dalmau et al., "Low-cost extruded plastic scintillator," Nuclear Instruments and Methods in Physics Research Section A, 2001, vol. 466, pp. 482-491.
Ritt et al., "The MIDAS Data Acquisition System," 1997, retrieved from http://daq.triumf.ca/~daqweb/ftp/publications/rt97_paper.ps, 4 pages.
Seven et al., "M. High-Yield Syntheses and Reactivity Studies of 1,2-Diborylated and 1,2,4,5-Tetraborylated Benzenes," Organometallics, 2014, vol. 33(5), pp. 1291-1299, 1 page, abstract only.
Shea et al., "The Helium-3 Shortage: Supply, Demand, and Options for Congress," Congressional Research Service, Dec. 22, 2010, retrieved from https://fas.org/sgp/crs/misc/R41419.pdf, 31 pages.

(56) References Cited

OTHER PUBLICATIONS

Sword, "Humidity-induced damage in polyvinyl toluene and polystyrene plastic scintillator," 2017 IEEE International Symposium on Technologies for Homeland Security (HST), Apr. 2017, pp. 1-4, abstract only.
Uhl et al., "The thermal stability of cross-linked polymers: methyl methacrylate with divinylbenzene and styrene with dimethacrylates," Polymer Degradation and Stability, vol. 71, No. 2, 2001, pp. 317-325, abstract only.
Yao et al., "Fluorinated poly(meth)acrylate: Synthesis and properties," Polymer, vol. 55, No. 24, 2014, pp. 6197-6211.
Yemam et al,, "Boron-rich benzene and pyrene derivatives for the detection of thermal neutrons," Scientific Reports, vol. 5, No. 13401, 2015, 9 pages.
Zaitseva et al., "Plastic scintillators with efficient neutron/gamma pulse shape discrimination," Nuclear Instruments and Methods in Physics Research A, vol. 668, 2012, pp. 88-93.
Official Action for U.S. Appl. No. 14/452,007, dated Dec. 9, 2015, 11 pages.
Official Action for U.S. Appl. No. 14/452,007, dated Jun. 1, 2016, 12 pages.
Official Action for U.S. Appl. No. 14/452,007, dated Dec. 12, 2016, 12 pages.
Notice of Allowance for U.S. Appl. No. 14/452,007, dated Jun. 15, 2017, 9 pages.
Official Action for U.S. Appl. No. 14/973,318, dated Oct. 31, 2016, 17 pages.
Official Action for U.S. Appl. No. 14/973,318, dated May 1, 2017, 20 pages.
Notice of Allowance for U.S. Appl. No. 14/973,318, dated Aug. 24, 2017, 16 pages.

\* cited by examiner

10B ENRICHED PLASTIC SCINTILLATORS FOR APPLICATION IN THERMAL NEUTRON DETECTION, METHODS OF MAKING AND USING THE SAME

CROSS REFERENCE TO RELATED APPLICATIONS

This application claims priority and benefits under 35 U.S.C. § 119(e) to U.S. Provisional Patent Application Ser. No. 62/542,065 filed on Aug. 7, 2017, and U.S. Patent Application Ser. No. 62/589,920 filed on Nov. 22, 2017, each of which are incorporated herein in their entirety by reference.

GOVERNMENT LICENSE RIGHTS

This invention was made with government support under grant number HDTRA1-11-1-0025 awarded by the Department of Defense and grant number DHS-14-DN-077-AR-NC7 awarded by the Department of Homeland Security. The government has certain rights in the invention.

FIELD OF THE INVENTION

The present invention relates to a $^{10}$B enriched plastic scintillators, methods of making the same and methods of using the same.

BACKGROUND

Over the past decade, the rapid increase in deployment of radiation portal monitors to address domestic and international security concerns has produced a significant demand for $^3$He gas. $^3$He is a stable isotope of helium that is used in the detection of neutron radiation as a counting gas in proportional counters. These detectors are not only used for security purposes but also found in large scale neutron science experiments as well as in nuclear scattering and imaging research fields. With the demand for $^3$He gas far outweighing the production, the US federal government began rationing $^3$He, only allocating it to certain groups or for certain purposes.

Plastic scintillators are traditionally utilized in radiation detection systems as a first line detection method. Their large volume, relatively low cost, and fast response times allow for their efficient use as gross counters, but they provide very limited spectroscopic information about the incident radiation. Due to their large hydrogen content, plastic scintillators are sensitive to fast neutron radiation via proton collisions that in turn have a thermalizing effect on the incident neutrons, allowing them to be detected by the currently employed $^3$He based proportional counters. Carboranes have traditionally been used as additives to increase boron content in plastic scintillators however, they are very expensive.

SUMMARY

The present invention relates to a novel $^{10}$B enriched molecule that can be incorporated into common plastic scintillators (for example a poly(vinyltoluene) (PVT) based plastic scintillator) to achieve enhanced thermal neutron detection. The present invention also relates to the plastic scintillator containing the $^{10}$B enriched molecule, methods of making the enriched molecule, methods of using the molecule and methods of using plastic scintillators containing the molecule. The method to make the $^{10}$B enriched plastic scintillator begins with relatively inexpensive $^{10}$B enriched boric acid, and yields a $^{10}$B enriched 4,4,5,5-tetramethyl-2-phenyl-1,3,2-dioxaborolane (MBB) in three high yield steps. MBB is soluble and compatible with PVT based formulations and results in clear stable plastic scintillators.

The present invention incorporates the $^{10}$B isotope into plastic scintillators via organo-boron based molecules. The natural abundance of $^{10}$B (~20%) in boron chemicals, organic chemistry methods, and the nuclear properties of the capture reaction (shown in Equation 1) allow for the development of new detector materials.

$$^{10}B + n_{th} \rightarrow \begin{cases} ^7Li_{(1.01 MeV)} + \alpha_{(1.78 MeV)} \\ Q = 2.790 \text{ MeV, } 6.3\% \\ ^7Li^*_{(0.84 MeV)} + \alpha_{(1.47 MeV)} \\ \hookrightarrow {}^7Li^* \rightarrow {}^7Li + \gamma_{(478 KeV)} \\ Q = 2.310 \text{ MeV, } 93.7\% \end{cases} \quad (1)$$

Figure 1:
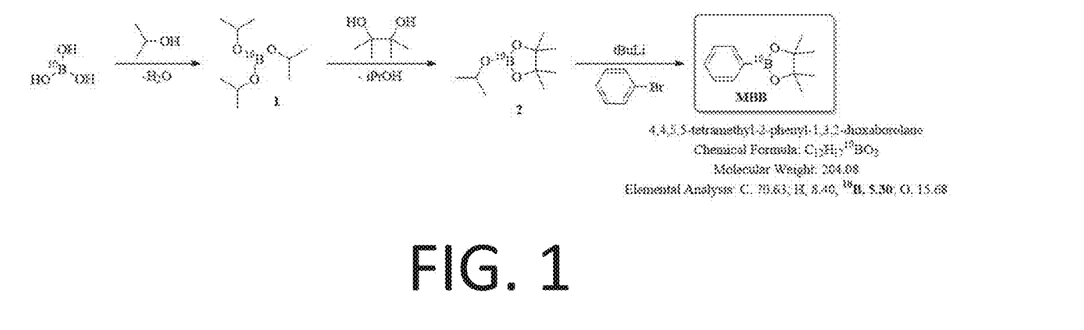
FIG. 1 illustrates a first method to form a MBB precursor material.

At thermal neutron energies of about 25 meV, $^{10}$B has a neutron reaction cross section of about 3837 barns (compared to $^3$He: 5333 barns). Carboranes have traditional been used as additives to increase boron content in plastic scintillators however, they are very expensive. Searching for more cost effective alternatives, commercially available bis(pinacolato)diboron ($B_2Pin_2$) was utilized as the boron additive in plastic scintillators and also as a chemical precursor for borylated benzenes explored for the same purpose. Although good neutron detection capabilities were achieved, the solubility limit corresponding to the $^{10}$B content was about 0.2 wt. %. To increase the $^{10}$B content, and therefore enhance neutron detection, the use of $^{10}$B enriched precursors were explored. The precursors could provide lower material loading into the plastic matrix while maintaining or increasing neutron sensitivity, and enhancing mechanical integrity of the resultant plastic scintillators. One such precursor, specifically $^{10}$B enriched 4,4,5,5-tetramethyl-2-phenyl-1,3,2-dioxaborolane, or monoborylated benzene (MBB), can be produced in three high yield steps. The steps to form the MBB are illustrated in FIG. 1. The molecular weight of the MBB is about 204.08, and the elemental analysis is C (about 70.63); H (about 8.40); $^{10}$B (about 5.30); and O (about 15.68). The MBB can be incorporation into the polymer matrix (e.g. PVT) based scintillators for use in thermal neutron detection. MBB was admixed into the polymer at loadings up to about 20.0 wt. % (about 1.06 wt. % $^{10}$B).

An aspect of the invention is a $^{10}$B enriched plastic scintillator. The $^{10}$B enriched plastic scintillator includes between about 0.5 wt. % and about 25 wt. % of a 10B enriched isotope 4,4,5,5-tetramethyl-2-phenyl-1,3,2-dioxaborolane (MBB), and a polymer.

An aspect of the invention is a method to produce a $^{10}$B enriched isotope 4,4,5,5-tetramethyl-2-phenyl-1,3,2-dioxaborolane (MBB). The method includes mixing boric acid with a tert-butyl alcohol at a temperature between about 160° C. and about 200° C. for between 3 hours and about 10 hours to form a first mixture. The first mixture is combined with a pinnacle at a temperature between about 160° C. and about 200° C. for between about 2 hours and about 5 hours to produce a second solution. A bromobenzene material is deoxygenated by bubbling an inert gas to produce a bubbled bromobenzene. The bubbled bromobenzene is combined with a tert-butyl lithium for between about 10 minutes and about 2 hours (30 minutes) to form a third solution. The second solution is combined with the third solution over a time period of between about 10 minutes and about 2 hours at a temperature of between about −90° C. and about −50° C. to form a fourth solution. The $^{10}$B enriched isotope MBB is extracted from the fourth solution.

An aspect of the invention is a method of detecting neutron or radiation. The method includes providing a plastic scintillator to an area, where the plastic scintillator includes a $^{10}$B isotope enriched 4,4,5,5-tetramethyl-2-phenyl-1,3,2-dioxaborolane (MBB) and a polymer.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

The present invention relates to the synthesis of a novel $^{10}$B enriched molecule, which can be aromatic, that can be incorporated into based plastic scintillators to achieve enhanced thermal neutron detection. The invention also relates to the plastic scintillator comprising MBB. The invention also relates to a method to use the plastic scintillator comprising the MBB.

An aspect of the invention is a method to produce $^{10}$B enriched MBB. The method includes mixing boric acid with a tert-butyl alcohol to form a first mixture at a temperature between about 160° C. and about 200° C. for between about 3 hours and about 10 hours. The first mixture is combined with a pinnacle to produce a second solution, where the first mixture and the pinnacle are mixed at a temperature between about 160° C. and about 200° C. for between about 2 hours and about 5 hours. Bromobenzene is deoxygenized to produce a bubbled bromobenzene material. Suitable bromobenzene materials include, but are not limited to, 1,4-dibromobenzene, 1,3-dibromobenzene, or combinations thereof. The deoxygenation can occur in a positive pressure environment, and can be performed until bubbles form in the material. The positive pressure environment can be an inert gas environment, for example an argon environment. The bubbled bromobenzene is mixed with a tert-butyl lithium for between about 10 minutes and about 2 hours to form a third solution. The third solution is combined with the second solution for between about 10 minutes and about 2 hours at a temperature between about −90° C. and about −50° C. to form a fourth solution. The MBB is extracted from the fourth solution. In some embodiments, the MBB can be dried, which can then be concentrated.

The boric acid can be enriched. In some embodiments, the boric acid can be enriched to greater than about 90 wt. % boric acid. Suitable tert-butyl alcohols can include isopropanol. The tert-butyl alcohol.

The concentration of the tert-butyl lithium can be between about 1.3M and about 3.2M, in some embodiments, about 1.8 M of the tert-butyl lithium can include the hydrocarbon. The hydrocarbon can be present as an anhydrous hydrocarbon, for example anhydrous pentane.

The temperature to mix the boric acid with the tert-butyl alcohol can between about 160° C. and about 200° C., in some embodiments about 180° C. The reaction time can be between about 3 hours and about 10 hours, in some embodiments about 6 hours. The molar ratio of the boric acid to the tert-butyl alcohol can be between about 1:1 and about 1:2. The boric acid and tert-butyl alcohol can produce the first precursor and water, where the water is removed or reduced by evaporation. The first precursor (i.e. the first mixture) can be combined with the pinnacle (e.g. two —OH groups) at a temperature between about 160° C. and about 200° C., in some embodiments about 180° C. The reaction time can be between about 1 hour and about 5 hours, in some embodiments about 2 hours to about 3 hours. The molar ratio of the first mixture to the pinnacle can be between about 1:1 and about 1:2. This reaction can form an alcohol (e.g. isopropanol), which can be removed to form the second precursor (i.e. isopropoxy $^{10}$Bpin) (Bpin).

The bromobenzene can be deoxygenated by purging the bromobenzene with an inert gas. Suitable inert gases include argon, helium, nitrogen, or combinations thereof. The bromobenzene can be deoxygenated at least once for at least about 2 minutes, in some embodiments between about 2 minutes and about 2 hour, in some embodiments between about 10 minutes and about 15 minutes, in some embodiments about 30 minutes. The deoxygenating process can occur at least once, in some embodiments for between about 1 and about 10 times, in some embodiments about four times.

The bubbled, or deoxygenated, bromobenzene can be combined with tert-butyl lithium. The tert-butyl lithium can be in a hydrocarbon, for example pentane, to form a third solution. The concentration of the tert-butyl lithium in the pentane is between about 1.0M to about 3.6M, in some embodiments between about 1.5M and about 3.2M. The molar ratio of the bubbled bromobenzene to the tert-butyl lithium can be between about 1:1 and about 1:2. The tert-butyl lithium can be added to the bromobenzene in a dropwise manner.

The second solution can be combined with the third solution over a time period of between about 10 minutes and about 2 hours, in some embodiments for about 30 minutes at a temperature between about −90° C. and about −50° C., in some embodiments about −78° C. The ratio of the second solution and the third solution can be between about 1:0.8 and about 1:1.2, in some embodiments a molar ratio of 1:1.

An alcohol can be added to the fourth solution. The alcohol can be used to quench any excess tert-butyl remaining in the fourth solution. Suitable alcohols include isopropyl alcohol, ethanol, butanol, methanol, propanol, or combinations thereof.

Figure 2A:
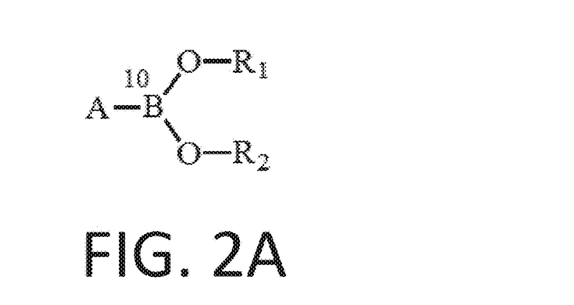
FIG. 2A illustrates a $^{10}$B enriched MBB material that can be used with the present invention.
Figure 2B:
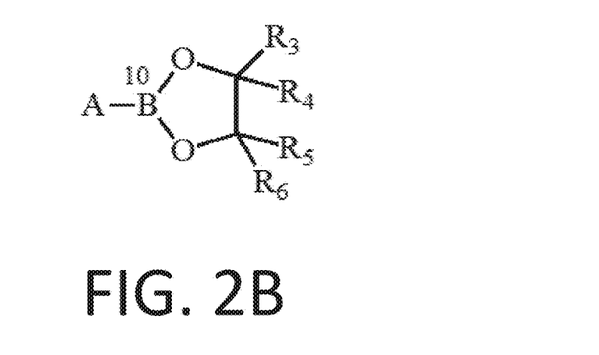
FIG. 2B illustrates a $^{10}$B enriched MBB material that can be used with the present invention.
Figure 2C:
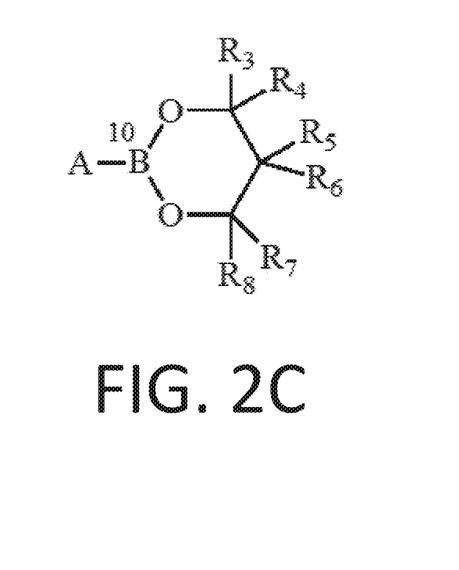
FIG. 2C illustrates a $^{10}$B enriched MBB material that can be used with the present invention.

The resulting product, MBB, can be extracted from the fourth solution with an ether, for example diethyl ether, dimethyl ether, or combinations thereof. The extracted MBB can be dried with a drying material, for example magnesium sulfate. In some embodiments, the product, MBB, can be vacuum distilled to remove volatile materials, and then the MBB can be collected as a solid material. Vacuum distilling can occur at a temperature between about 0° C. and about 100° C., for between about 1 minute and about 24 hours, at a pressure of between about 0.2 psia and about 2 psia. The final product can be characterized by proton and carbon nuclear magnetic resonance ($^1$H and $^{13}$C NMR) and have the following properties $^1$H NMR (500.0 MHz, $CDCl_3$) δ 1.34 (s, 12H), 7.34-7.38 (t, 2H), 7.44-7.47 (t, 1H), 7.80-7.81 (d, 2H). $^{13}$C $^1$ NMR (125.8 MHz, $CDCl_3$): δ 135.13 (CH), δ 131.65 (CH), δ 128.10 (CH), δ 84.15 ($CCH_3$), δ 25.24 ($CH_3$), n.o. (C-B). Structures of the resulting MBB product are provided in FIGS. 2A-2C. From FIGS. 2A-2C A is an aromatic group such as phenyl, substituted phenyl, naphthyl, substituted naphthyl and $R_1$-$R_8$ are hydrogen, fluoro, alkyl, fluoro alkyl groups. Alkyl groups can be methyl, ethyl, propyl, isopropyl, and butyl. Fluoroalkyl groups can be alkyl groups as previously described where hydrogens on the alkyl groups are replaced by fluorine atoms.

An aspect of the invention is a dopant. The dopant can be used in a plastic scintillator. The dopant can be MBB. The MBB is enriched in $^{10}$B isotopic. The MBB can be aromatic. The MBB can be characterized by proton and carbon nuclear magnetic resonance ($^1$H and $^{13}$C NMR) and have the following properties $^1$H NMR (500.0 MHz, $CDCl_3$) δ 1.34 (s, 12H), 7.34-7.38 (t, 2H), 7.44-7.47 (t, 1H), 7.80-7.81 (d, 2H). $^{13}$C $^1$NMR (125.8 MHz, $CDCl_3$): δ 135.13 (CH), δ 131.65 (CH), δ 128.10 (CH), δ 84.15 ($CCH_3$), δ 25.24 ($CH_3$), n.o. (C-B).

An aspect of the present invention is a method of making a plastic scintillator comprising a dopant. The method includes mixing a monomer, an initiator, and MBB. In some embodiments, at least one dopant can be added. The resulting mixture is then polymerized to form the plastic scintillator.

In some embodiments, the monomer can be vinyltoluene monomer (VT), methyl methylacrylate, styrene, carbonate, or combinations thereof. The formed from the monomers can be polyvinyl toluene (PVT), poly(methyl methylacrylate) (PMMA), styrene monomers (PS), polycarbonate (PC) or combinations thereof. In some embodiments, the monomer can include an inhibitor, which can be removed. For example, if the monomer is VT, an initiator can be removed by flowing the monomer through a plug, for example an aluminum gel plug. The exact method to remove the inhibitor will be dictated by the inhibitor and/or the monomer, and one skilled in the art would understand how to remove the inhibitor in order to prepare the monomer for polymerization. The initiator can be azobisisobutyronitrile (AIBN), benzoyl peroxide, tert-amyl peroxybenzoate, 4,4,-Azobis(4-(cyclohexanecarbonitrile), 2,2-bis(tert-butylperoxy)butane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl) benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid, potassium persulfate, or combinations thereof. The curing temperature can determine the initiator to be used. For example, if the curing temperature is between about 60° C. and about 90° C., then AIBN can be used as an initiator. In some embodiments, the initiator can be recrystallized. The initiator can be used as a radical initiator. The initiator can be mixed with the monomer such that the amount of initiator in the mixture of the initiator and the monomer is between about 0.01 wt. % and about 0.1 wt. %. Suitable primary dopants include 2,5-diphenyloxazole (PPO), 9,9-dimethyl-2-phenyl-9H-fluorene ("PhF"), and combinations thereof. Suitable secondary dopants, i.e. a wavelength shifter, include 1,4-bis(5-phenyloxazol-2-yl) benzene ("POPOP"), 9,10-diphenylantracene ("DPA"), 9-9-dimethyl-2,7-di((E)-styryl)-9H-flourene ("SPS"), 1,4-Bis(2-methylstyryl)benzene ("Bis-MSB"), and combinations thereof. In some embodiments, PPO can be used as a primary dopant while POPOP can be used as a wavelength shifter. In some embodiments the dopants can include a primary dopant. The primary dopant can be included in the mixture in an amount between about 1 wt. % and about 20 wt. %. In some embodiments, a wavelength shifter dopant can be included in the mixture in an amount between about 0.01 wt. % and about 1 wt. %. Additional information about the method of forming the plastic scintillator and the plastic scintillator can be found in U.S. patent application Ser. No. 16/005,368, filed on Jun. 11, 2018, which is incorporated herein by reference.

The mixture can be deoxygenated by subjecting the mixture to an inert gas. The inert gas can be argon, helium, nitrogen, or combinations thereof. The mixture can be polymerized in an inert environment at a temperature of between about 20° C. and about 120° C., in some embodiments about 80° C. for between about 24 hours and about 168 hours, in some embodiments about four days (i.e. between about 96-120 hours). The polymerized material can be subjected to an elevated temperature cure of between about 20° C. and about 120° C., in some embodiments about 90° C. for between about 24 hours and about 96 hours, in some embodiments about one day (i.e. between about 24 hours and about 48 hours).

Between about 0.5 wt. % and about 25 wt. % of MBB can be added to the monomer solution. If desired, between about 0 and about 2 wt. % enriched $^{10}$B (for example a carborane) can be added to the monomer solution.

The plastic scintillator (i.e. the polymerized material) can be processed once formed. For example, the plastic scintillator can be machined and/or polished on at least a portion of at least one surface. Furthermore, the polymerization can occur in a mold, which can be determined by the end use and dimensions of the scintillator.

Additional information about the formation of the plastic scintillator can be found in U.S. Pat. No. 9,864,077, which issued on Dec. 17, 2015, which is incorporated herein by reference in its entirety.

An aspect of the invention is a 10B enriched plastic scintillator. The enriched plastic scintillator includes between about 0.5 wt. % and about 20 wt. % of a MBB dopant, and a polymer.

The scintillator includes between about 0.5 wt. % and about 20 wt. % of the MBB dopant. Suitable MBB dopants can include the materials provided in FIGS. 2A-2C, or combinations thereof. In some embodiments, the polymer of the scintillator can be PVT, PMMA, PS, PC or combinations thereof. The polymer can be present in the scintillator in an amount between about 85-95 wt. % or can be the balance once the remaining materials are included in the scintillator. Other material can also be included in the scintillator, including an additional $^{10}$B isotope. The amount of dopant can be between about 0 wt. % and about 2 wt. %. When additional $^{10}$B isotope(s) is used, the amount of polymer in the scintillator can decrease accordingly (i.e. the balance can be polymer). Suitable $^{10}$B isotopes include Bpin. Incidental materials can also be included in the scintillator. In some embodiments, the plastic scintillator can include between about 0.3 and 0.1 wt. % of one or more carborane. In some embodiments, the plastic scintillator does not comprise $^{3}$He or carboranes.

The light yield of the scintillator can be between about 58% and about 89%. Furthermore, the scintillator can not degrade for at least about one year. The boron capture peak of the scintillator can be between about 200 and about 900.

An aspect of the invention is a method of using a 10B enriched plastic scintillator to detect radiation. The method includes providing a 10B enriched plastic scintillator. The 10B enriched plastic scintillator includes a 10B material, MBB, and a polymer. The plastic scintillator is used to detecting radiation.

The plastic scintillator can be incorporated into a device. The device can be a particle detector, a camera, a scanner, a photomultiplier, a hand held device, or the like, or combinations thereof. The device can be used in any suitable application to detect the neutron, including but not limited to, oil and gas operations (including drilling, fracking, completing, and the like), a person, specialty materials (for example, special nuclear materials such as uranium or plutonium), reactor area, laboratories, cargo, or other areas where the presence of neutrons is known or suspected. The method can also be used to detect neutron and gamma signals in airport security, or neutron therapy, for example. The device can provide an alert if neutrons or radiation is detected. The alert can be a light signal. The light signal can be based on the thermal neutron signal via boron capture.

EXAMPLES

Example 1: Synthesis of MBB

A starting material for the synthesis of MBB can be enriched boric acid (>96% $^{10}$B) The precursor was purchased from Ceradyne Inc. Precursors 1 and 2 illustrated in FIG. 1 were altered to include an enriched $^{10}$B material. For MBB preparation, a dry two-neck 250 mL round-bottom flask equipped with a stir bar and a dropping funnel was evacuated and refilled with argon four times. Tert-butyl lithium ($^{t}$BuLi) (about 50 mL of an about 1.7M solution in pentane, about 0.085 mol) was added to the flask using a cannula followed by about 45.0 mL of anhydrous pentane. The solution was cooled to about −78° C. and stirred for about 30 minutes. Bromobenzene was added to a dry 50.0 mL round bottom flask (about 8.45 mL, about 0.079 mol) followed by vacuum/argon refill four times then by about 10-15 minutes of bubbling argon through the solution followed by an additional vacuum/argon refills four times. Anhydrous THF (about 10 mL) was added to the bromobenzene and the resultant solution transferred to a dropping funnel that was then slowly added dropwise into the $^{t}$BuLi solution (at about −78° C.) over a period of about 30 minutes. The solution went from pale yellow to off-white after approximately 2 hours of stirring. Then dry isopropoxy $^{10}$Bpin (15.9 g, 0.085 mol) was added to the dropping funnel and slowly dripped into the reaction over 30 minutes. The reaction was stirred at −78° C. for a day. The reaction vessel was removed from the cold bath and allowed to warm to room temperature with stirring for 5 hours. Isopropyl alcohol was slowly added to the completed reaction in order to quench any excess $^{t}$BuLi. The reaction was then extracted with diethyl ether, dried with magnesium sulfate, and concentrated to remove the majority of the solvents. The product was vacuum distilled to remove the remaining volatile materials and then collected as a white solid and stored in the freezer until needed. (Yield 46%, 7.54 g) The final product was characterized by proton and carbon nuclear magnetic resonance ($^{1}$H and $^{13}$C NMR). $^{1}$H NMR (500.0 MHz, CDCl$_{3}$) δ 1.34 (s, 12H), 7.34-7.38 (t, 2H), 7.44-7.47 (t, 1H), 7.80-7.81 (d, 2H). $^{13}$C $^{1}$ NMR (125.8 MHz, CDCl$_{3}$): δ 135.13 (CH), δ 131.65 (CH), δ 128.10 (CH), δ 84.15 (CCH$_{3}$), δ 25.24 (CH$_{3}$), n.o. (C-B).

Example 2: Formation of Plastic Scintillator

Purified vinyltoluene monomer (VT) (inhibitor removed by flowing through an alumina gel plug) and recrystallized azobisisobutyronitrile (AIBN) radical initiator were mixed with a variable of specific wt. % of dopants. After being sparged with argon to de-oxygenate the mixture, the samples were polymerized in glass jars (surfaces silanized to prevent sticking) in an inert atmosphere oven at about 80° C. for about four days then for about 90° C. for about one day. The glass jars were broken to provide the approximately 20 gram plastic scintillators (which were about 4.7 cm diameter by about 1.1-1.3 cm). The plastic scintillators were then machined and polished. Each finished sample was wrapped in a reflective tape, coupled to a photomultiplier tube (PMT), and exposed to fields of ionizing radiation. The samples response was measured with a data acquisition system (DAQ) based on a 250 Msample/sec waveform digitizer built in-house, controlled by a Maximum Integrated Data Acquisition Software (MIDAS) interface. PPO was used as the primary dopant and POPOP was used as a wavelength shifter.

Example 3: Testing of Plastic Scintillators

The plastic scintillators formed using the method outlined in Example 2 were tested. Light yield (LY) of a sample was determined by comparing the positions of the Compton Edge (C.E.) feature resulting from exposure to a $^{137}$Cs source, to a Saint Gobain Crystals BC-408 commercial sample. The known energy of the C.E. allowed us to calibrate each sample individually and establish an individual sample energy scale (in keV$_{ee}$). Next, the samples were exposed to a $^{244}$Cm/$^{13}$C source in various shielding configurations, which produce different mixed neutron and gamma fields. The sample responses to fast and thermalized neutron fluences were recorded to identify and analyze the $^{10}$B neutron capture reaction as well as any n/γ PSD capabilities. Gamma background spectra were taken with the use of a cadmium shield around the sample. The ROOT data analysis framework was utilized to analyze the collected data, and develop relevant output spectra.

The solubility limits of MBB in vinyltoluene was tested to determine how much $^{10}$B could be added (as indicated earlier, the detection of thermal neutrons is achieved via the $^{10}$B), as well as testing the compatibility of MBB with a plastic scintillator formulation (PVT over doped with 20.0 wt. % PPO) that allowed for PSD for further particle identification. Table 1 details the various samples that were produced and tested for radiation response. MBB was still soluble in PVT at about 20.0 wt. %, however, polymerization of the final plastic was already significantly hindered at this level. The total mass of each sample was approximately 20 grams and contained about 1 wt. % PPO and 0.1 wt. % POPOP, except that samples 6-10 and 13 contained 20 wt. % of PPO and 0.1 wt. % POPOP. The $^{10}$B content assumes 100% enrichment. All values in Table 1 are approximate.

TABLE 1

Sample list of MBB containing scintillators

| Sample | m-Carborane content wt. % | MBB content wt. % | $^{10}$B content wt. % | Light yield (LY) % of BC-408 |
|---|---|---|---|---|
| 1 | | 5 | 0.26 | 77 |
| 2 | | 10 | 0.53 | 67 |
| 3 | | 15 | 0.80 | 67 |
| 4 | | 20 | 1.06 | 54 |
| 5 | | 5.3 | 0.28 | 80 |
| 6 | | 5.3 | 0.28 | 58 |
| 7 | | 1 | 0.05 | 89 |
| 8 | 0.34 | | 0.05 | 79 |
| 9 | 1.88 | | 0.28 | 69 |
| 10 | 1 | | 0.15 | 72 |
| 11 | 5 | | 0.75 | 59 |
| 13 | 5.3 | | 0.79 | 42 |

Figure 3:
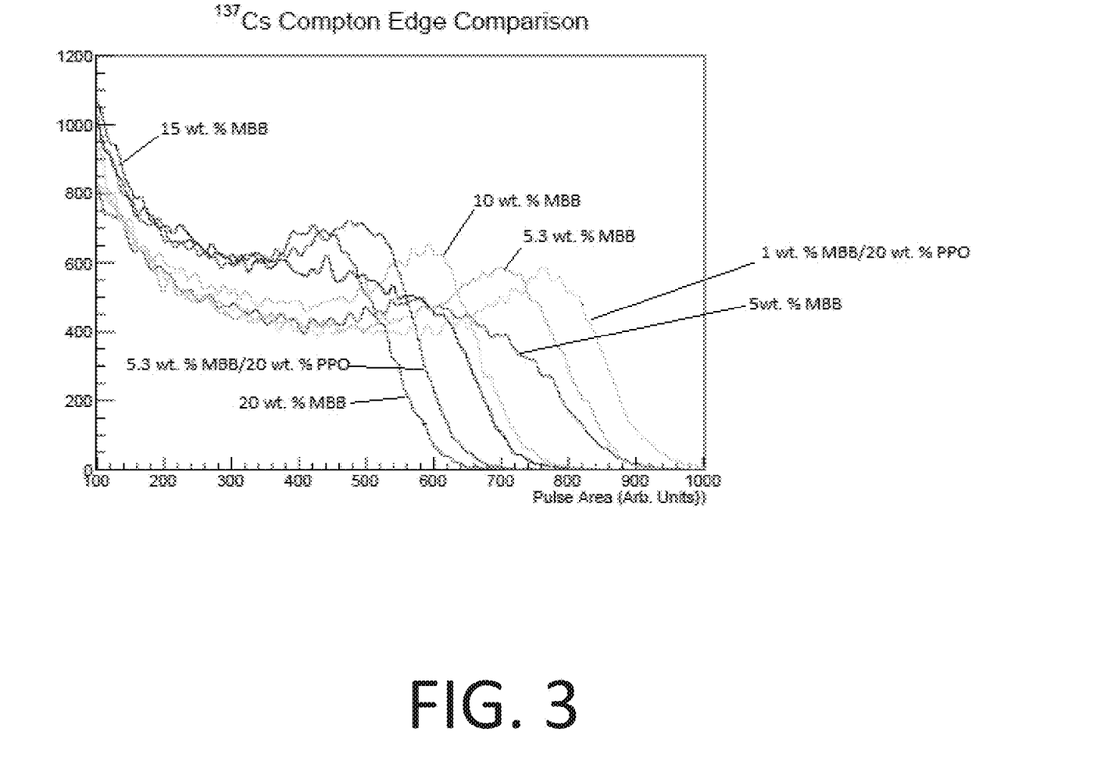
FIG. 3 illustrates the number of counts vs pulse area in scintillating PVT based samples containing $^{10}$B enriched MBB, acquired from response to a $^{137}$Cs γ-source.

The measured $^{137}$Cs response of samples containing MBB are illustrated in FIG. 3 The Compton Edge position (indicating light output) trends lower with increasing MBB. The two samples with the lowest LY (sample 4 and 6) were too soft to fully machine or polish, due to the amount of dopants (combined MBB and PPO) in the sample. Likely, incomplete polymerization lowered the LY as well as poor optical coupling to the photodetector. The LY of the samples vary from >50% to ~90% of a commercial control sample (BC-408; app. 11,000 photons/1 MeV; 64% anthracene). The m-carborane containing samples all polymerized to clear, colorless samples, which were hard enough to machine and polish. However, the drop off in LY is more pronounced for m-carborane samples containing equivalent amounts of $^{10}$B to MBB samples, likely due to the absence of aromatic groups in m-carborane compared to MBB.

Figure 4:
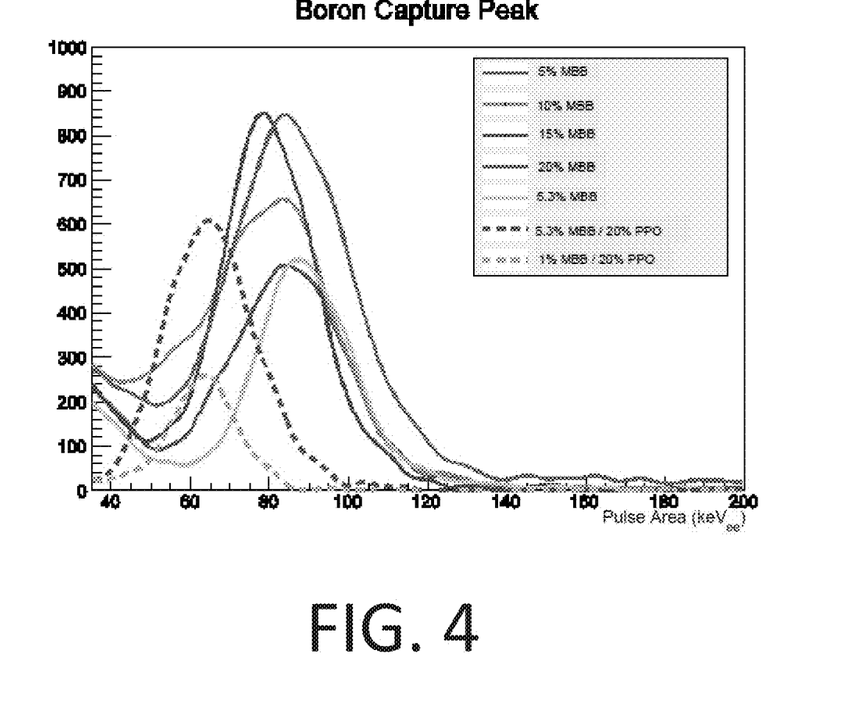
FIG. 4 illustrates the number of counts versus calibrated pulse area (keV$_{ee}$) for $^{10}$B thermal neutron capture reaction spectra with gamma response subtracted via cadmium shielded measurement.

FIG. 4 illustrates the thermal neutron capture peaks resulting from exposing the samples to thermalized neutrons. Data was collected for 20 minutes with an analogous gamma background run subtracted where cadmium shielding surrounded the sample. The relative peak positions are similar between samples that contain 1 wt. % PPO (~85-90 keV$_{ee}$) (i.e. samples 1-5) as compared to the samples that contain 20.0 wt. % PPO (~64 keV$_{ee}$) (samples 6 and 7) regardless of MBB content. There is no additional quenching of the capture signal as the MBB content is increased, with the peak energy shifting only when significant quantities of the primary fluor are included. The peak counts (captures) trend up with $^{10}$B content, until a maximum capture rate is achieved (~15 wt. % MBB, 0.8 wt. % $^{10}$B).

Figure 5A:
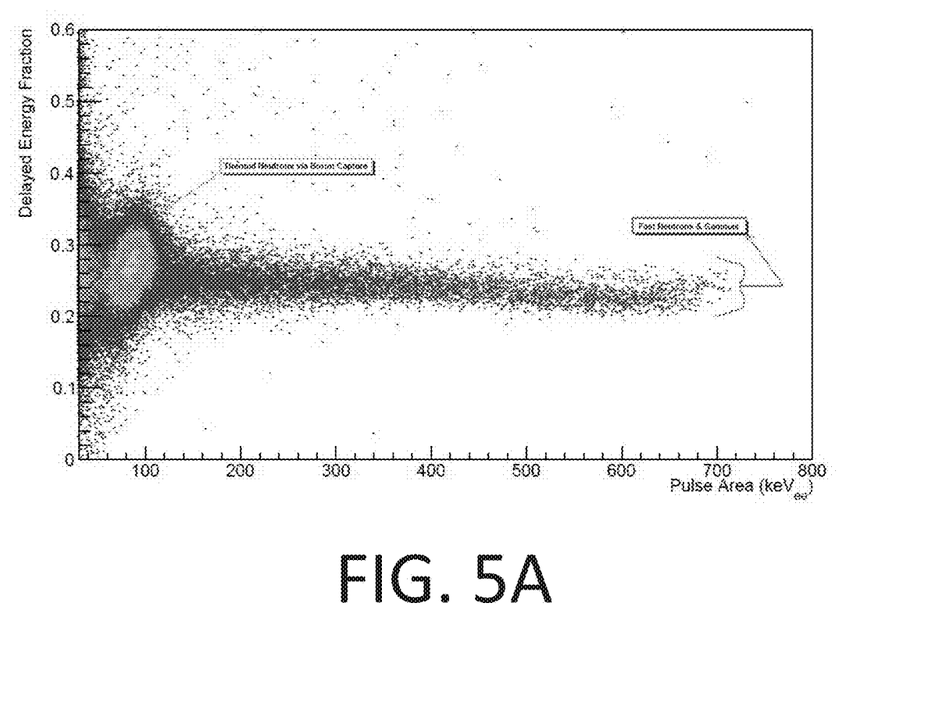
FIG. 5A illustrates a full Pulse Area over Delayed Area (PSD) fraction spectrum of polyvinyl toluene (PVT) sample 5 from Table 1 containing varying amounts of PPO, when exposed to a mixed neutron/gamma field which has been heavily thermalized via high density polyethylene shielding.
Figure 5B:
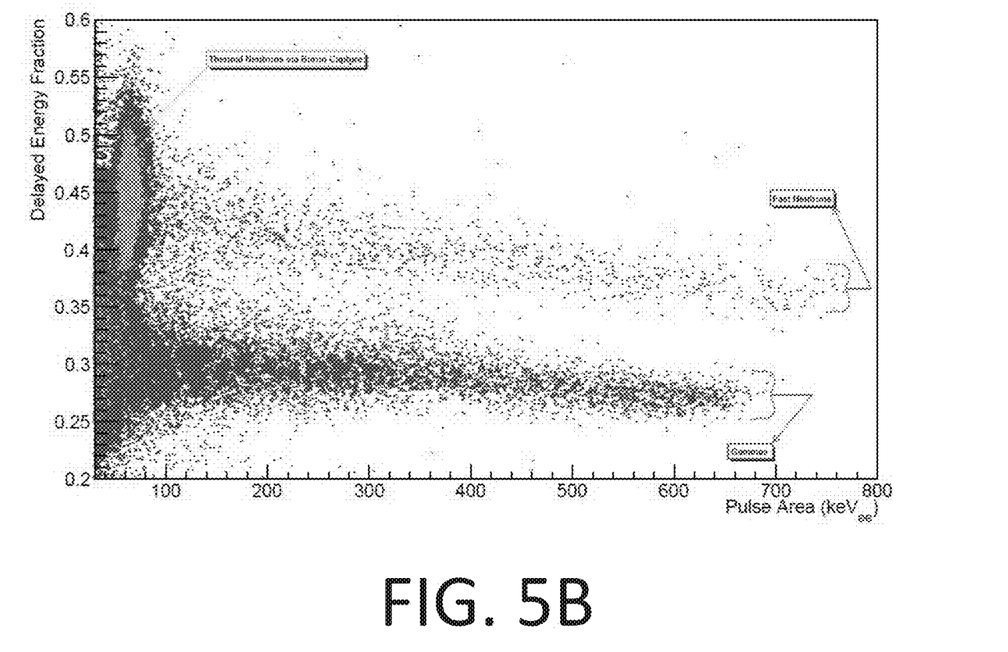
FIG. 5B illustrates a full PSD fraction spectrum of PVT sample 7 from Table 1 containing varying amounts of PPO, when exposed to a mixed neutron/gamma field which has been heavily thermalized via high density polyethylene shielding.
Figure 6:
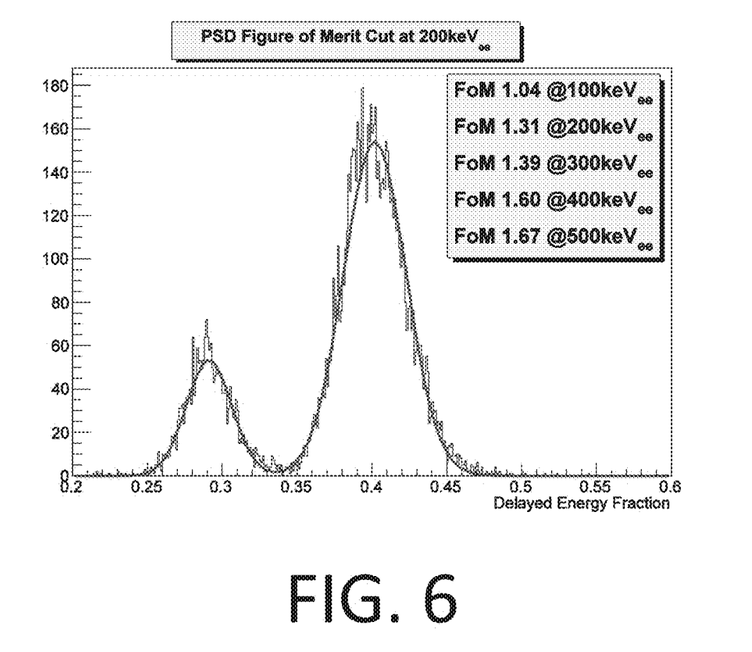
FIG. 6 illustrates a PSD Figure of Merit (FoM) values resulting from various energy cuts (spectrum shown from 200 keV$_{ee}$ cut) using the same sample as in FIG. 3 in the "lead cave" setup and projecting the full PSD spectrum after the energy cut onto the γ-axis.

As MBB doping is compatible with PPO over doping to achieve PSD, the pulse shapes generated by the 20.0 wt. % PPO containing samples can be analyzed through integration of pulse content over a prompt and a delayed time interval. A 2-D spectrum of sample 5 is illustrated in FIG. 5A, while sample 7 is illustrated in FIG. 5B, where the monoenergetic capture reaction from thermalized neutrons (FIG. 4 is an x-projection of this feature) is seen along with the separated signal bands from fast neutrons and the gammas. In sample 5 these bands are overlaid and can not be discriminated from each other, while in sample 7, (containing over doped amounts of PPO) the signal bands are clearly separated, allowing for effective fast and thermal neutron/gamma discrimination. A y-projection of this spectrum made at an energy cut of 200 keV$_{ee}$ is illustrated in FIG. 6, along with various PSD FoM values for other energy cuts. These FoM values correspond well to analogous samples that contain no MBB dopant, indicating no loss in PSD capabilities through the new dopant. FoM values are calculated via equation (2).

$$FoM = \frac{Centroid_n - Centroid_g}{FWHM_n + FWHM_g} \qquad (2)$$

Figure 7A:
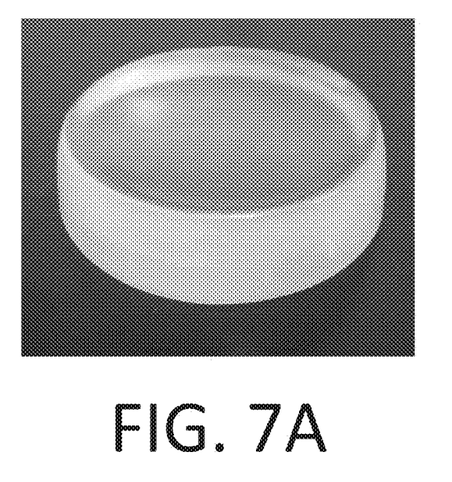
FIG. 7A illustrates a plastic scintillator sample containing 20 wt. % PPO, 0.1% POPOP and 1% MBB in PVT UV light.
Figure 7B:
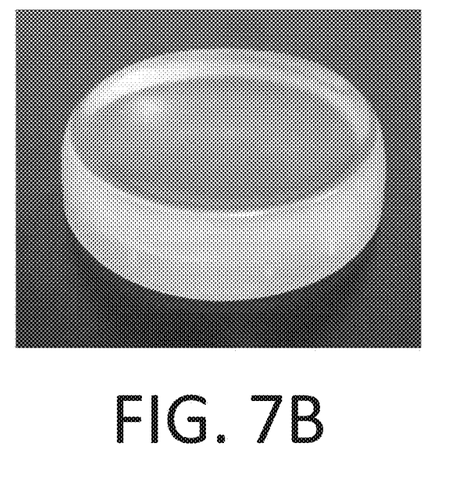
FIG. 7B illustrates a plastic scintillator sample containing 20 wt. % PPO, 0.1% POPOP and 1% MBB in PVT natural light.
Figure 7C:
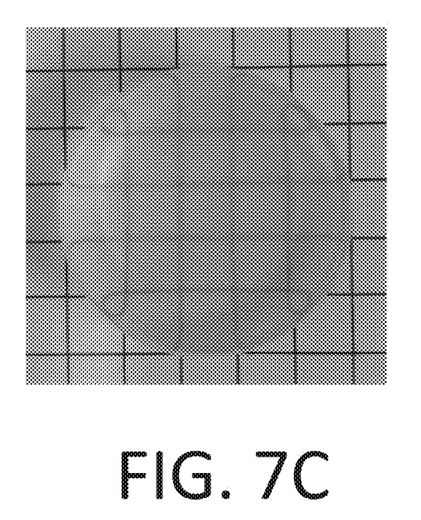
FIG. 7C illustrates a 1 wt. % PPO/5.3 wt. % MBB one year after synthesis, with only slight clouding, no yellowing and minimal crazing occurring over time.

The plastic scintillator samples containing MBB did not display significant aging over the course of one year. There is no indication of oxidative yellowing, and the dopant does not appear to migrate or precipitate from the plastic matrix. The production method (radical bulk polymerization) can occasionally introduce some heterogeneous clouding during polymerization, however, the clouding does not grow or intensify with age. Sample 5 was tested after storage at ambient conditions for 11 months, and lost approximately 14% of the initially measured LY. FIGS. 7A-7C illustrates images of samples over time.

Ranges, for example temperature ranges, duration ranges, ranges of ratios of different material, weight percentages, and others, have been discussed and used within the forgoing description. One skilled in the art would understand that any sub-range within the stated range would be suitable, as would any number within the broad range, without deviating from the invention.

The foregoing description of the present invention related to plastic scintillators has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A $^{10}$B enriched plastic scintillator, comprising:
   between about 0.5 wt. % and about 25 wt. % of a $^{10}$B enriched isotope 4,4,5,5-tetramethyl-2-phenyl-1,3,2-dioxaborolane (MBB); and
   a polymer.

2. The scintillator of claim 1, further comprising between about 0.5 wt. % and about 15 wt. % of the $^{10}$B isotope.

3. The scintillator of claim 1, wherein a light yield of the plastic scintillator is between about 58% and about 89%.

4. The scintillator of claim 1, wherein the scintillator does not degrade for up to about one year.

5. The scintillator of claim 1, further comprising between about 1 wt. % and about 8 wt. % of the MBB.

6. The scintillator of claim 1, wherein the scintillator does not comprise at least one of a carborane or $^{3}$He.

7. The method of claim 1, wherein the polymer is at least one of polyvinyl toluene, poly(methyl methylacrylate), polystyrene, or polycarbonate.

8. A method of detecting neutron or radiation, comprising:
   providing a plastic scintillator comprising:
      a $^{10}$B enriched 4,4,5,5-tetramethyl-2-phenyl-1,3,2-dioxaborolane (MBB); and
      a polymer;
   providing the plastic scintillator an area to detect the neutron or radiation.

9. The method of claim 8, wherein the area is on at least one person.

10. The method of claim 8, wherein plastic scintillator is incorporated into a device.

11. The method of claim 8, wherein the device is at least one of a particle detector, a camera, a scanner, a photomultiplier, or a hand held device.

12. The method of claim 8, wherein the device provides an alert is a neutron or radiation is detected.

* * * * *